(12) United States Patent
Park

(10) Patent No.: US 9,309,966 B2
(45) Date of Patent: *Apr. 12, 2016

(54) METHOD OF CONTROLLING VEHICLE WASHING MODE FOR VEHICLE EQUIPPED WITH SHIFT-BY-WIRE SHIFTING DEVICE

(71) Applicants: Hyundai Motor Company, Seoul (KR); Kia Motors Corporation, Seoul (KR)

(72) Inventor: Hangil Park, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/665,310

(22) Filed: Mar. 23, 2015

(65) Prior Publication Data

US 2015/0192203 A1 Jul. 9, 2015

Related U.S. Application Data

(60) Continuation of application No. 14/170,347, filed on Jan. 31, 2014, now abandoned, which is a division of application No. 12/877,443, filed on Sep. 8, 2010, now Pat. No. 8,682,548.

(30) Foreign Application Priority Data

Dec. 4, 2009 (KR) .................. 10-2009-0119718

(51) Int. Cl.
*G06F 7/00* (2006.01)
*G06F 17/00* (2006.01)
(Continued)

(52) U.S. Cl.
CPC ............... *F16H 61/16* (2013.01); *F16H 59/08* (2013.01); *F16H 59/50* (2013.01); *F16H 59/68* (2013.01);
(Continued)

(58) Field of Classification Search
CPC ............... F16H 59/08; F16H 61/0006; F16H 2059/006; F16H 59/68; F16H 59/74; F16H 61/16
USPC ................ 701/51, 58, 60, 62, 64, 95
See application file for complete search history.

(56) References Cited

U.S. PATENT DOCUMENTS 4,817,471 A * 4/1989 Tury ...................... F16H 59/12
477/121
2003/0022755 A1* 1/2003 Mizutani ............. F02D 41/0225
477/107

(Continued)

FOREIGN PATENT DOCUMENTS

JP 2002-286131 A 10/2002
JP 2008-290562 A 12/2008
(Continued)

*Primary Examiner* — Khoi Tran
*Assistant Examiner* — Jorge Peche
(74) *Attorney, Agent, or Firm* — Morgan, Lewis & Bockius LLP

(57) ABSTRACT

A method of controlling a vehicle washing mode for a vehicle equipped with shift-by-wire shifting device, may include performing an N-range-off determining step that determines whether a shift lever is in an N-range when an engine stops, performing an ACC determining step that determines whether the vehicle is in an ACC state, and performing a shifting step that shifts a P-range state of a transmission to a N-range state thereof by operating an actuator, when the N-range-off determining step determines that the shift lever is in the N-range when the engine was stopped, and when the ACC determining step determines that the vehicle is in the ACC state.

3 Claims, 4 Drawing Sheets

(51) Int. Cl.
*F16H 61/16* (2006.01)
*F16H 59/08* (2006.01)
*F16H 61/00* (2006.01)
*F16H 59/50* (2006.01)
*F16H 59/68* (2006.01)
*F16H 59/74* (2006.01)
*F16H 59/00* (2006.01)

(52) U.S. Cl.
CPC ............ F16H 59/74 (2013.01); F16H 61/0006 (2013.01); *F16H 2059/006* (2013.01); *F16H 2059/6823* (2013.01); *F16H 2059/746* (2013.01)

(56) References Cited

U.S. PATENT DOCUMENTS

| | | | | | |
|---|---|---|---|---|---|
| 2008/0115613 | A1* | 5/2008 | Giefer | .................... | B60K 37/06 74/473.21 |
| 2009/0176619 | A1* | 7/2009 | Inoue | ..................... | B60T 1/005 477/96 |
| 2011/0087386 | A1* | 4/2011 | Steinhauser | .......... | F16H 63/483 701/2 |
| 2011/0132121 | A1* | 6/2011 | Park | .................... | F16H 63/3466 74/473.12 |
| 2012/0010785 | A1* | 1/2012 | Kanai | ..................... | B60L 8/003 701/48 |
| 2012/0138394 | A1* | 6/2012 | Park | ......................... | B60T 7/12 188/1.11 E |
| 2012/0305360 | A1* | 12/2012 | Kitaori | ................ | F16H 63/3466 192/219.4 |
| 2012/0309590 | A1* | 12/2012 | Kanai | ..................... | F16H 61/12 477/92 |

FOREIGN PATENT DOCUMENTS

| | | | |
|---|---|---|---|
| KR | 1998-044800 | A | 9/1998 |
| KR | 1999-0048288 | A | 7/1999 |
| KR | 10-2004-0041935 | A | 5/2004 |
| KR | 10-2005-0050571 | A | 5/2005 |
| KR | 10-0921048 | B1 | 10/2009 |
| WO | WO 2009/027163 | A1 | 3/2009 |
| WO | WO 2009027163 | A1 * | 3/2009 ............ F16H 63/483 |

* cited by examiner

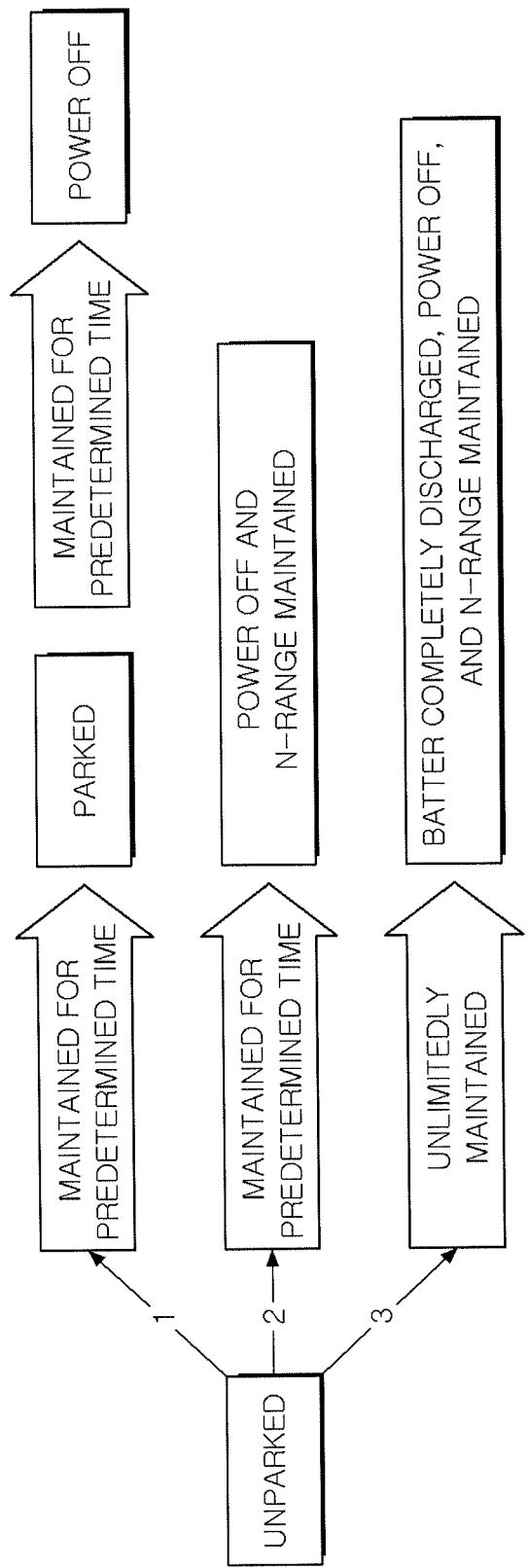

METHOD OF CONTROLLING VEHICLE WASHING MODE FOR VEHICLE EQUIPPED WITH SHIFT-BY-WIRE SHIFTING DEVICE

CROSS-REFERENCE TO RELATED APPLICATIONS

The present application is a continuation of U.S. patent application Ser. No. 14/170,347, filed Jan. 31, 2014, which is a divisional of U.S. patent application Ser. No. 12/877,443, filed Sep. 8, 2010, now U.S. Pat. No. 8,682,548, issued Mar. 25, 2014, which claims priority to Korean Patent Application Number 10-2009-0119718 filed Dec. 4, 2009, the entire contents of which application are incorporated herein for all purposes by these references.

BACKGROUND OF THE INVENTION

1. Field of the Invention

The present invention relates to a method of controlling a vehicle washing mode for a vehicle equipped with a shift-by-wire shifting device, in more detail, a technology for implementing an N-range state required when vehicle washing is performed by a vehicle washing apparatus, in a vehicle that automatically shifts to a P-range by an automatic parking function of a transmission even if the engine of the vehicle is stopped in an N-range state.

2. Description of Related Art

Shift-by-wire shifting devices are devices that control a transmission, using electric signals, in response to signals generated when a driver operates the shift lever, without transmitting the operational force of the shift lever applied by the user through a mechanical cable, as in the related art.

Meanwhile, in vehicle washing using a vehicle washing apparatus, it is required to release the driving wheel of a vehicle to freely rotate by unlocking the P-range of the transmission.

However, in a vehicle equipped with a shift-by-wire shifting device of the related art, even if the engine of the vehicle is stopped in the N-range state, a mechanical device, such as a parking sprag, automatically and physically shift the transmission to the P-range range by an automatic parking function of the transmission.

Therefore, it is required to shift the transmission to the N-range range for vehicle washing by a specific measure, such that it is required to additionally provide specific hardware.

Meanwhile, in general, the engine is stopped but the electric accessories, such as an audio system, are supplied with power in the ACC state with the transmission is in the N-range state, during a vehicle washing mode for washing a vehicle, such that the vehicle washing is performed while the driver uses the audio system etc.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a method of controlling a vehicle washing mode for a vehicle equipped with a shift-by-wire shifting device that can maximize convenience of a user and commercial value of the vehicle, by automatically implementing a vehicle washing mode, which allows automatic vehicle washing, by automatically shifting the P-range state to the N-range state, when a driver stops the engine in the N-range.

In an aspect of the present invention, a method of controlling a vehicle washing mode for a vehicle equipped with shift-by-wire shifting device, may include performing an N-range-off determining step that determines whether a shift lever is in an N-range when an engine stops, performing an ACC determining step that determines whether the vehicle is in an ACC state, and performing a shifting step that shifts a P-range state of a transmission to a N-range state thereof by operating an actuator, when the N-range-off determining step determines that the shift lever is in the N-range when the engine was stopped, and when the ACC determining step determines that the vehicle is in the ACC state.

The method may further include performing a TCU (Transmission Control Unit)-off checking step that checks whether a controller that controls the transmission is turned off is operated, after the ACC determining step and before performing of the shifting step, and performing the shifting step when the TCU-off checking step determines that the controller that controls the transmission is turned off.

The N-range state of the transmission may be maintained for a predetermined time for vehicle washing, and then after the predetermined time passes, the controller automatically performs shifting the N-range state to the P-range state and after a predetermined time passes again, cuts the power when there is no operation to the vehicle.

The N-range state of the transmission may be maintained for a predetermined time for vehicle washing and the power is cut with the N-range state of the transmission maintained.

The N-range state of the transmission may be maintained for a predetermined time for vehicle washing and a current state of the vehicle is maintained.

In another aspect of the present invention, the method of controlling a vehicle washing mode for a vehicle equipped with shift-by-wire shifting device, which automatically implement a P-range state in a transmission when an engine is stopped in an N-range state of a shift lever, may include shifting the transmission from the P-range state to an N-range state thereof by operating an actuator, when the engine is stopped, an ACC state is implemented in the vehicle, and the shift lever is in the N-range state when the engine is stopped.

The method may further include shifting the transmission from the P-range state to the N-range state, by operating the actuator, when the engine stops, the ACC state is implemented in the vehicle, the transmission is not in the N-range state when the engine is stopped, and a controller is turned off.

The present invention makes it possible to maximize convenience of a user and commercial value of the vehicle, by automatically implementing a vehicle washing mode, which allows automatic vehicle washing, by automatically shifting the P-range state to the N-range state, when a driver stops the engine in the N-range in a vehicle equipped with a shift-by-wire shifting device.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 4 is a diagram exemplifying a control method that can be selectively performed after being unparked by the control method of the present invention.

Figure 1:
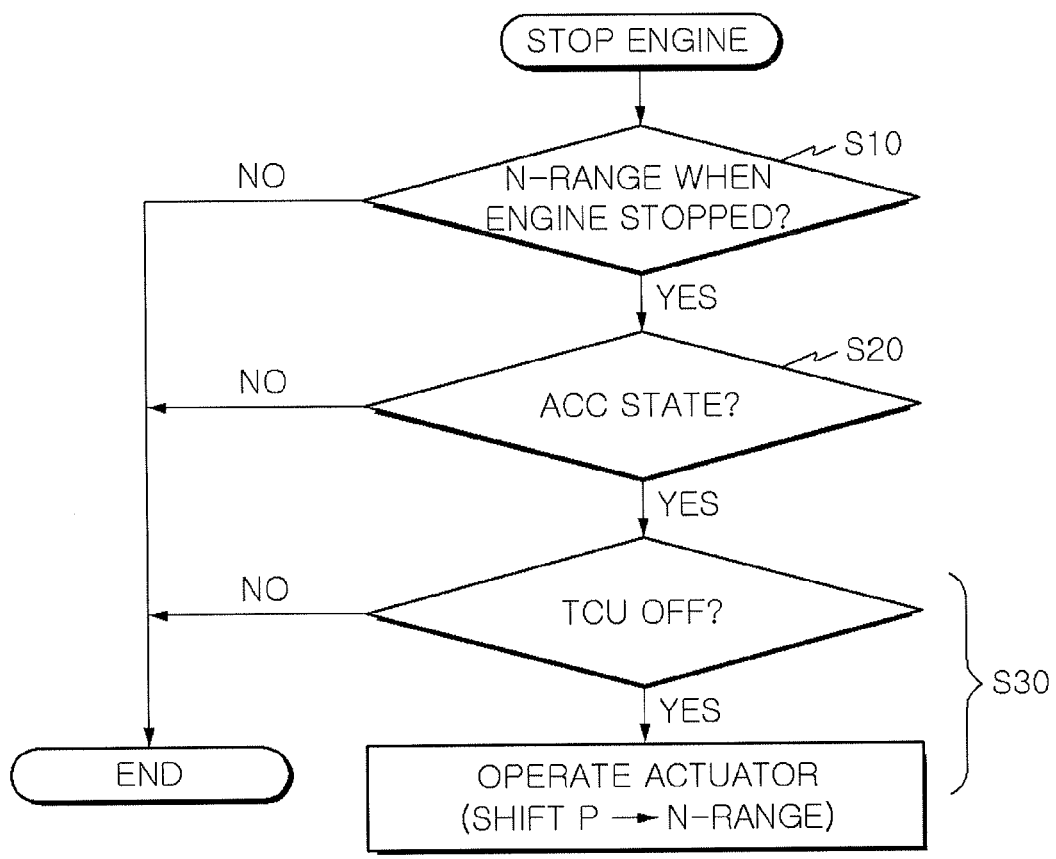
FIG. 1 is a flowchart illustrating an embodiment of a method of controlling a vehicle washing mode for a vehicle equipped with a shift-by-wire shifting device according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, an embodiment of the present invention includes when the engine stopped, an N-range-off determining step (S10) that determines whether a shift lever was an N-range when the engine stops, an ACC determining step (S20) that determines whether the vehicle is in ACC state, and a shifting step (S30) that shifts the P-range state to the N-range state of a transmission by operating an actuator, when the N-range-off determining step (S10) determines that the shift lever was the N-range when the engine was stopped, and when the ACC determining step (S20) determines that the vehicle is in the ACC state.

That is, the actuator is automatically operated to shift the transmission from the P-range to the N-range, when conditions are satisfied, after determining that the state when the driver stops the engine and the state after the engine stops.

In this configuration, the actuator includes an electric motor, in which it is possible to achieve a mechanism in which as a cable is pulled by operating the electric motor, a lever included in the transmission is operated and the parking sprag in the transmission is released, such that the P-range is unlocked to the N-range.

In the present embodiment, before the shifting step (S30), a TCU-off checking step that checks whether a controller that controls the transmission is turned off is additionally performed, and the shifting step (S30) is performed when the TCU-off checking step determines that the controller that controls the transmission is turned off, such that safety is improved in the control.

That is, when the TCU (Transmission Control Unit), which is the controller that controls the transmission, is turned on, interference may occur in the control of the TCU, such that this configuration can remove the interference in the control, in cases.

For reference, in addition to the controller that executes the control method of the present invention, a lever controller that processes signals according to the operation of the shift lever can be used as the controller, independent from the TCU.

According to the control method having the configuration according to an exemplary embodiment of the present invention, as the driver positions the shift lever to the N-range for automatic vehicle washing and turns off the engine in the ACC state, the P-range state of the transmission which is automatically implemented by stopping the engine is unlocked to the N-range state by automatically operating the actuator, such that the automatic vehicle washing can be easily used.

Figure 3:
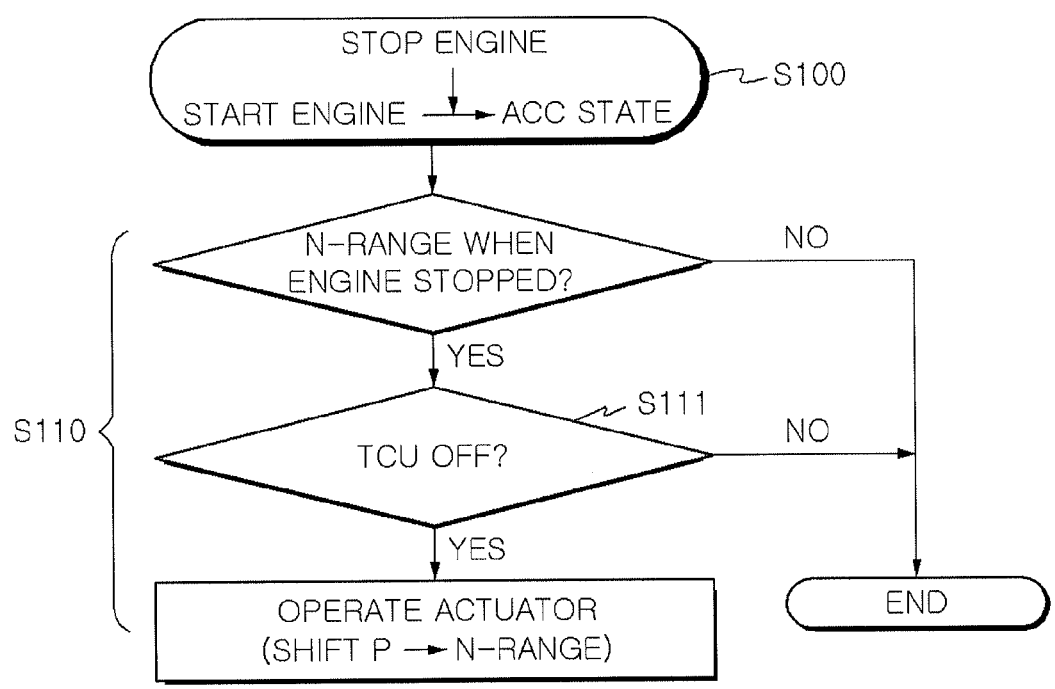
FIG. 3 is a flowchart illustrating another embodiment of a method of controlling a vehicle washing mode for a vehicle equipped with a shift-by-wire shifting device according to the present invention.

The control method of the present invention described above can be implemented in various modified embodiments, as show in FIG. 3. According to the embodiment shown in FIG. 3, as the engine stops and the ACC state is implemented (S100), when the shift lever is in the N-range range when the engine was stopped, the P-range state of the transmission is shifted to the N-range state of the transmission by operating the actuator (S110).

That is, it is separately performed to determine whether it is the ACC state in the present embodiment, but the configuration is simplified such that the separate determination is removed by determining that the ACC state was implemented with the engine starting and the control is possible in accordance with only whether the shift lever was the N-range when the engine was stopped.

The present embodiment will be easily used for a vehicle equipped with not a smart button start system, but a start system using a star key of the related art.

That is, when a start system using a start key of the related art is used, the engine-on state can be easily converted to the adjacent ACC state, therefore, when the transmission was in the N-range in this case, the N-range state is automatically implemented for vehicle washing by the control method of the present invention.

Figure 2:
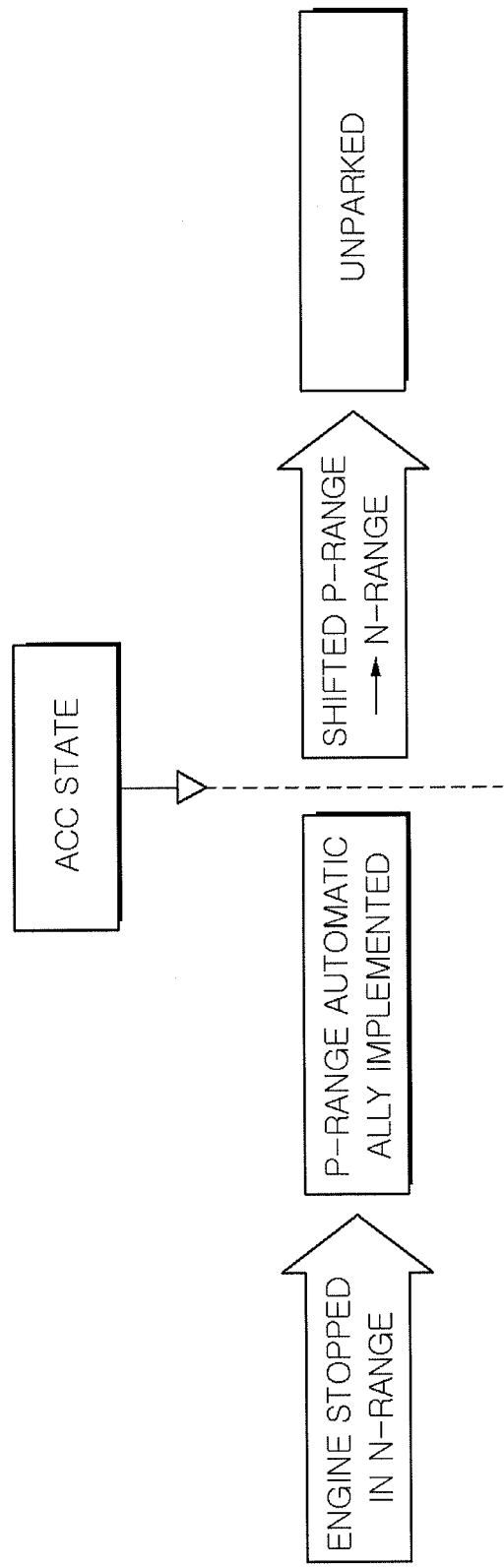
FIG. 2 is a diagram simply illustrating the concept of the control method according to the present invention.

On the other hand, in the embodiment of FIG. 2, it is required to press down the brake pedal and push the smart button with the engine stopped in order to implement the ACC state in a vehicle equipped with a smart button start system, such that it is required to check whether it is ACC state in a specific step.

The above embodiments exemplify preferable cases and do not limit the present invention.

In the embodiment of FIG. 3, similarly, when the engine stops and the ACC state is implemented (S100), the shift lever is in the N-range state when the engine is stopped, it is required to additionally check whether the controller that controls the transmission is turned off (S111). Accordingly, it is possible to improve safety by preventing interference in control by shifting the transmission from the P-range state to the N-range state, by operating the actuator, only when the controller is turned off.

For reference, FIG. 2 is a diagram simply illustrating the operational concept of the present invention described above.

Further, as exemplified in FIG. 4, according to an exemplary embodiment of the present invention, it is possible to selectively perform a following control.

That is, when unparking is performed by the control described above, the vehicle can be controlled to follow any one of the different three methods that are processed along the first to third arrows.

The first case is that the unparking described is maintained for a predetermined time for vehicle washing, and then after the predetermined time passes, the controller automatically performs parking and monitors that a predetermined time passes again, and cuts the power if there is no operation.

The predetermined time for determining whether to perform the parking again is appropriately set in consideration of the time for sufficient vehicle washing in accordance with the objects of the present invention, and the predetermined time for determining whether to cut the power can be appropriately selected in consideration of the range where the battery of the vehicle is too much discharged.

The second case is that the unparking described above is maintained for a predetermined time for vehicle washing and the power is cut with the N-range state maintained such that the battery is not discharged any more.

The predetermined time in this case is also appropriately set in consideration of the time for sufficient vehicle washing in accordance with the objects of the present invention.

The third case is that the unparking described above is maintained for a predetermined time for vehicle washing and the current state is unlimitedly maintained if there is no operation such that the battery is completely discharged and the power is cut. In this case, the transmission is also maintained in the N-range state.

In this case, since the user is likely to make other operations before the battery is completely discharged and the power is cut, the battery is not substantially completely discharged and the power is cut in many cases, and it is difficult to exactly know how much time is required for the vehicle washing. Therefore, parking is performed again after the predetermined time passes during the vehicle washing in the first case, however, in this case, control substantially satisfying the requirements of the user can be achieved without the problem described above.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling a vehicle washing mode for a vehicle equipped with shift-by-wire shifting device, the method comprising:

performing an N-range-off determining step determining whether a shift lever is in an N-range, when an engine stops;

performing an ACC determining step determining whether the vehicle is in an ACC state;

automatically implementing a vertical washing mode when the engine stops and in the N-range to allow for vehicle washing;

performing a shifting step shifting a P-range state of a transmission to an N-range state thereof by operating an actuator, when the N-range-off determining step determines that the shift lever is in the N-range when the engine was stopped, and when the ACC determining step determines that the vehicle is in the ACC state;

performing a TCU (Transmission Control Unit)-off checking step of checking that whether a controller controlling the transmission is turned off, is operated, after the ACC determining step and before performing the shifting step; and performing the shifting step when the TCU-off checking step determines that the controller that controls the transmission is turned off, wherein the N-range state of the transmission is maintained for a predetermined time for vehicle washing, and then after the predetermined time passes, the controller automatically performs shifting the N-range state to the P-range state and after a predetermined time passes again, cuts an electric power to the vehicle when the vehicle is not operated.

2. The method as defined in claim 1, wherein the N-range state of the transmission is maintained for the predetermined time for vehicle washing and the electric power is cut with the N-range state of the transmission maintained.

3. The method as defined in claim 1, wherein the N-range state of the transmission is maintained for the predetermined time for vehicle washing and a current state of the vehicle is maintained.

\* \* \* \* \*